July 11, 1961      P. F. KIEHL      2,991,964
PARACHUTE WITH AUTOMATIC CANOPY DEFLATING DEVICE
Filed April 11, 1958
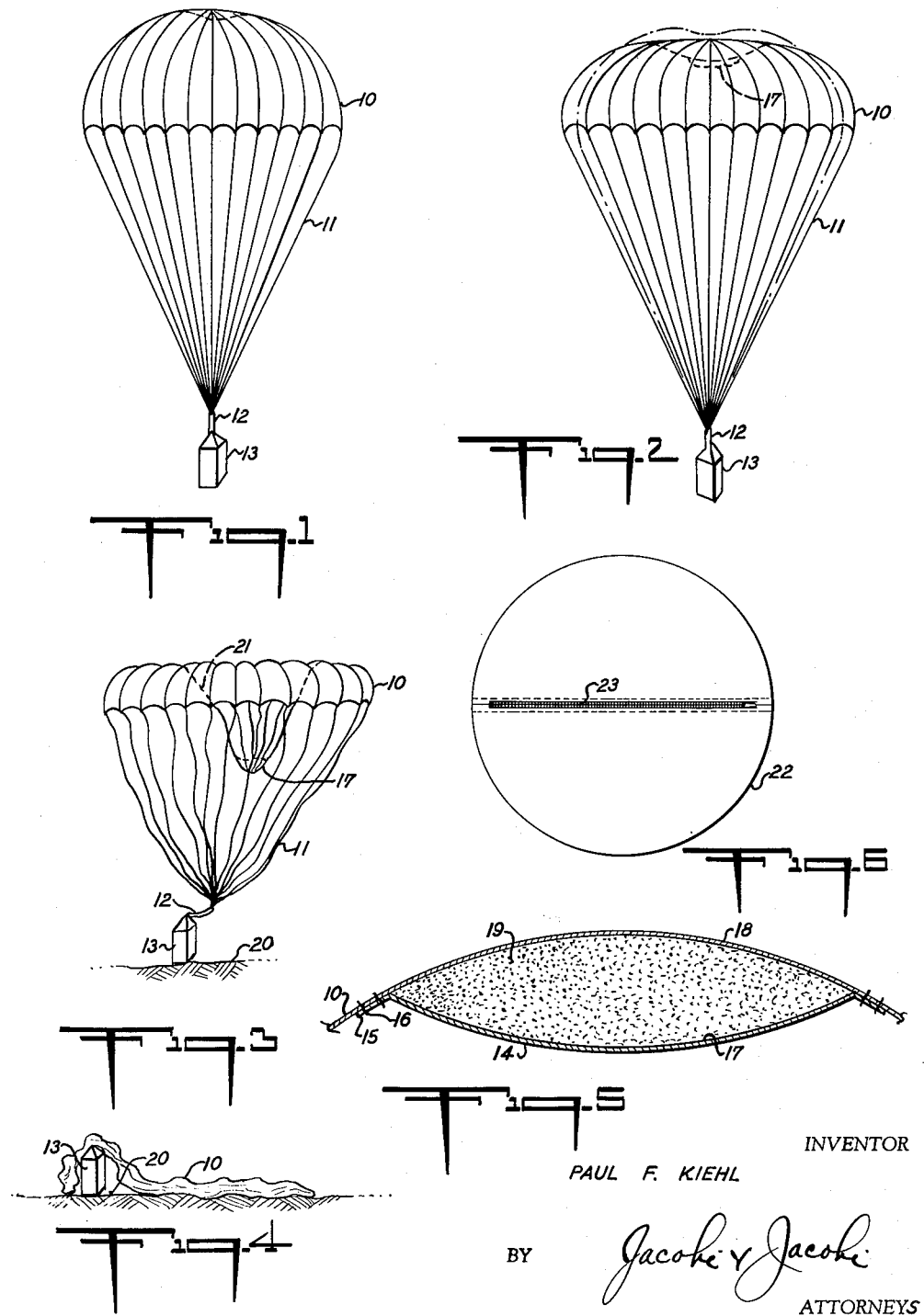
INVENTOR
PAUL F. KIEHL
BY *Jacobi & Jacobi*
ATTORNEYS

United States Patent Office 2,991,964
Patented July 11, 1961

2,991,964
PARACHUTE WITH AUTOMATIC CANOPY DEFLATING DEVICE
Paul F. Kiehl, Vandalia, Ohio, assignor to M. Steinthal & Company, Inc., New York, N.Y., a corporation of New York
Filed Apr. 11, 1958, Ser. No. 727,850
3 Claims. (Cl. 244—145)

This invention relates to aeronautics and more particularly to a parachute incorporating automatic means for deflating the canopy of the parachute upon contact of the load carried thereby with the ground.

Parachutes are now in common use for the delivery of various types of military and other equipment, for the recovery of missiles, test equipment or other objects, as well as for the use of airborne troops and for safety equipment for aircraft personnel. As is well known, the moment at which the load carried by a parachute touches the ground is extremely critical in that, if there is any appreciable wind blowing, the parachute as well as the load carried thereby will be dragged along the ground sometimes resulting in damage to the equipment or injury to the person attached to the parachute and also necessitating the expenditure of valuable time in retrieving the load as well as the parachute.

It has been attempted to overcome this important problem by providing automatic equipment which will disconnect the load carried by the parachute immediately upon contact of the same with the ground. Devices for this purpose have been developed and utilized, but the same are relatively complex and costly and are not at all times reliable which may well result in serious consequences. Furthermore, where an automatic disconnecting device is utilized, the parachute will be carried an appreciable distance away from the point of ground contact and consequently, additional personnel is necessary in order to retrieve the parachutes and furthermore, such parachutes are frequently damaged due to becoming entangled in trees or other objects. A parachute is a relatively costly item and consequently, elimination of the necessity of providing an automatic load disconnecting device and the provision of means for automatically deflating the canopy of the parachute at the point of ground contact represents a material advancement in the art.

It is accordingly an object of the invention to provide a parachute including a device for automatically deflating the canopy of such parachute upon contact of the load carried thereby with the ground.

A further object of the invention is the provision of a parachute including a device for automatically deflating the canopy thereof, which device has no adverse effect on the deceleration or drag characteristics of the parachute.

A still further object of the invention is the provision of a parachute including a device for automatically deflating the canopy thereof upon contact with the load carried by the parachute with the ground, which device may serve to increase the equipment carrying capabilities of such parachute.

Another object of the invention is the provision of a parachute including a device for automatically deflating the canopy thereof upon contact with the load carried by the parachute with the ground, such device operating to progressively invert the canopy thereby deflating the same.

A further object of the invention is the provision of a parachute including a device for automatically deflating the canopy thereof upon contact with the load carried by the parachute with the ground, which device may also be utilized to vary the decelerating or drag characteristics of the parachute as desired.

A still further object of the invention is the provision of a parachute including a device for automatically deflating the canopy thereof upon contact of the load carried by the parachute with the ground which device may include a weight attached to the canopy of the parachute adjacent the apex, such load representing a dead weight or an item of useful equipment.

Further objects and advantages of the invention will be apparent from the following description taken in conjunction with the accompanying drawing wherein:

FIG. 1 is an elevational view of a conventional prior art parachute in inflated condition and with a load attached thereto;

FIG. 2 a view similar to FIG. 1, but showing a parachute having the automatic canopy deflating device of this invention incorporated therein and further showing the configuration of the parachute canopy with the deflating device in full lines as compared to the configuration of the canopy without such device as showing in dotted lines;

FIG. 3 an elevational view showing a parachute including the automatic canopy deflating device of this invention at the moment of contact of a load carried thereby with the ground and the manner in which the deflating device operates to invert the canopy thereby accomplishing deflation thereof;

FIG. 4 a diagrammatic elevational view showing the deflated parachute and load carried thereby deposited on the ground;

FIG. 5 a transverse sectional view showing the structure of one form of canopy deflating device and the manner of attaching the same to the canopy of the parachute; and FIG. 6 a plan view of a canopy deflating device and including separable fastening means to permit the insertion or removal of useful items of equipment which may serve to provide the weight for accomplishing deflation of the parachute canopy.

With continued reference to the drawing, there is shown in FIG. 1 a conventional parachute of the type now commonly used for equipment delivery, missile or equipment recovery and for personnel safety equipment, such parachute including a canopy 10 having shroud lines 11 connected to the skirt thereof at spaced intervals with the shroud lines 11 terminating in a fitting 12 for connecting the shroud lines to an object 13 to be supported by the parachute. The object 13 may, of course, also be a person connected to the shroud lines by a suitable harness.

The canopy 10 of the parachute shown in FIG. 1 may be modified to provide an automatic deflating device which as best shown in FIG. 5, may take the form of a sheet of material 14 secured around the periphery 15 thereof by stitching 16 or the like to the canopy 10 of the parachute. The sheet of material 14 provides the bottom wall of a container 17, the top wall of which is provided by the portion 18 of the canopy 10 opposite the sheet of material 14 and such container 17 may be filled with a suitable loose granular material 19, such as lead shot or the like, in order to provide a weight of suitable mass. The mass of material 19 will be determined by the characteristics of the parachute with which the device is utilized together with the object to which the parachute is attached and the sheet of material 14 is secured to the canopy 10 of the parachute adjacent the apex thereof and as shown in full lines in FIG. 2, the provision of a weight at that location not necessarily closing the open vent area of a canopy, will serve to flatten the canopy to a certain extent and increase the diameter thereof thereby increasing the drag to an extent necessary to overcome the addition of the weight constituting the canopy deflating device. Consequently, the inclusion of such a weight will not in any way increase the rate of descent of the parachute since the inclusion of such weight will be automatically compensated for by the change in configuration of the parachute canopy. This fact can also be utilized for the purpose of changing the drag characteristics of a parachute, but the primary purpose of the invention is to accomplish an automatic deflating operation in a manner to be presently described.

A parachute incorporating the canopy deflating device of this invention may be dropped from an aircraft and the descent thereof will be perfectly normal until the load 13 carried by the parachute touches the ground 20 and at the instant of contact, the container 17 including the weight 19 carried thereby will continue to move downwardly at substantially the same velocity as the downward movement prior to ground contact, with the result that the canopy 10 will be progressively inverted as shown in full and dotted lines 21 in FIG. 3, which will result in deflating the canopy 10 thereby permitting the same to fall to the ground, as clearly shown in FIG. 4. Such deflation of the canopy 10 will prevent the same as well as the load carried thereby, from being dragged along the ground by the wind thereby precluding damage to the object 13 or the parachute, or in the case of a personnel type chute, injury to the user thereof and furthermore, such automatic deflation will preclude the necessity of assigning personnel to retrieve parachutes which may be blown for considerable distances from the point of ground contact. Where the material 19 constituting the deflating weight is of relatively high density, the bulk of the parachute is not materially increased and consequently the parachute may be packed in a deployment bag of substantially the same dimensions as heretofore utilized.

It is also contemplated that the deflating device constituting a weight attached to the canopy of the parachute adjacent the apex thereof may comprise useful equipment, rather than a dead weight, such as lead shot or the like and such equipment may, of course, represent a first aid kit, radio equipment, ammunition or any other useful items and while such equipment may be attached to the canopy in any desired manner, one form of the invention which would accomodate such equipment is shown in FIG. 6, in which a sheet of material 22 may be attached to the canopy in any suitable manner to provide the lower wall of a container, as in the form of the device described above, and the sheet of material 22 may be provided with separable fastening means 23 which may be in the form of a slide fastener or other suitable fastening means in order to permit access to the interior of the container for the insertion of articles of equipment and removal thereof from the container. Also if desired, the deflating weight might well include a blanket or other clothing of sufficient weight to accomplish the desired purpose and which would operate in the same manner as that described above to invert and deflate the canopy 10 of the parachute.

It will be seen that by the above described invention there has been provided an extremely simple automatic parachute canopy deflating device which will in no way adversely effect the drag or descent characteristics of the parachute and which will accomplish the desired result of automatically deflating the parachute canopy upon contact of the load carried thereby with the ground to prevent dragging of the parachute and the load carried thereby in the event a wind is blowing when the load carried by the parachute touches the ground. Furthermore, as clearly set forth above, the automatic canopy deflating device of this invention may if desired, constitute items of equipment which will provide sufficient weight for deflating purposes, yet will not in any way reduce the load carrying characteristics of the parachute, but on the other hand, will permit the delivery of additional equipment.

It will be obvious to those skilled in the art that various changes may be made in the invention without departing from the spirit and scope thereof and therefore the invention is not limited by that which is shown in the drawings and described in the specification, but only as indicated in the appended claims.

What is claimed is:

1. A parachute including a canopy, shroud lines secured to the skirt of said canopy at spaced points and terminating in load attaching means, a weight receiving container secured to said canopy adjacent the apex, said container comprising a sheet of material secured around the periphery to said canopy to provide a bottom wall with the opposed portion of said canopy providing the top wall of said container, said bottom wall having an opening and separable fastening means closing said opening to retain objects providing a weight in said container, whereby upon said load touching the ground thereby removing the load from said shroud lines and canopy, said weight will move downwardly to progressively invert said canopy and deflate the same.

2. A parachute including a canopy, shroud lines secured to the skirt of said capony at spaced points and terminating in load attaching means, a weight receiving container secured to said canopy adjacent the apex, said container comprising a sheet of material secured around the periphery to said canopy to provide a bottom wall with the opposed portion of said canopy providing the top wall of said container and a weight in said container, whereby upon said load touching the ground thereby removing the load from said shroud lines and canopy, said weight will move downwardly to progressively invert said canopy and deflate the same.

3. A parachute including a canopy, shroud lines secured to the skirt of said canopy at spaced points and terminating in load attaching means, a weight receiving container secured to said canopy adjacent the apex and a weight in said container, the sole function of said weight being to provide mass, whereby upon said load touching the ground thereby removing the load from said shroud lines and canopy, said weight will move downwardly to progressively invert said canopy and deflate the same.

References Cited in the file of this patent

UNITED STATES PATENTS 1,857,014    Ducoty _____ May 3, 1932